US011085546B2

(12) United States Patent
Meloy et al.

(10) Patent No.: US 11,085,546 B2
(45) Date of Patent: Aug. 10, 2021

(54) PURGE APPARATUS FOR USE WITH FLUID VALVES

(71) Applicant: Fisher Controls International LLC, Marshalltown, IA (US)

(72) Inventors: Robert Michael Meloy, Marshalltown, IA (US); Jeffrey Michael Von Arb, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 42 days.

(21) Appl. No.: 15/949,821

(22) Filed: Apr. 10, 2018

(65) Prior Publication Data

US 2019/0308225 A1 Oct. 10, 2019

(51) Int. Cl.
*F16K 5/06* (2006.01)
*B08B 9/00* (2006.01)
*F16K 5/08* (2006.01)

(52) U.S. Cl.
CPC .............. *F16K 5/0605* (2013.01); *B08B 9/00* (2013.01); *F16K 5/08* (2013.01)

(58) Field of Classification Search
CPC .................................. F16K 5/0605; F16K 5/08
USPC .................. 251/315.1, 315.16; 137/238, 240
See application file for complete search history.

(56) References Cited

U.S. PATENT DOCUMENTS

| 103,773 | A | 5/1870 | Pfleger |
| 136,622 | A | 3/1873 | Shellenback |
| 267,234 | A * | 11/1882 | Long ................. F16K 49/007 137/340 |
| 300,602 | A | 6/1884 | Hanlon |
| 320,252 | A | 6/1885 | Hey |
| 464,195 | A | 12/1891 | Forter |
| 473,953 | A | 5/1892 | Pattee |
| 474,227 | A | 5/1892 | Dexter |
| 541,990 | A | 7/1895 | Christie |
| 619,594 | A | 2/1899 | Martin |
| 722,419 | A | 3/1903 | Brunt |

(Continued)

FOREIGN PATENT DOCUMENTS

| DE | 2638602 | 3/1978 |
| DE | 19527285 | 1/1997 |

(Continued)

OTHER PUBLICATIONS

Score Energy Product Inc., "Jacketed Body, Traced Shaft, Traced Disc, Purged/Lubricated Bearings & Packing and Purged Seat & Seal," Technical Bulletin 105, date unknown, 2 pages.

(Continued)

*Primary Examiner* — Umashankar Venkatesan
(74) *Attorney, Agent, or Firm* — Hanley, Flight & Zimmerman, LLC

(57) ABSTRACT

Purge apparatus for use with fluid valves are disclosed. An apparatus includes a stem for a fluid valve. The stem has a first channel extending therethrough to receive a fluid. The apparatus also includes an aperture in fluid communication with the first channel and disposed on an outer surface of the stem or a fluid flow control member coupled to the stem. The aperture is to exhaust the fluid from the first channel toward one or more components of the fluid valve to remove residue.

25 Claims, 9 Drawing Sheets

(56) References Cited

U.S. PATENT DOCUMENTS

| | | | | |
|---|---|---|---|---|
| 870,487 | A | * | 11/1907 | Bertram .................. F16K 1/446 |
| | | | | 137/240 |
| 934,614 | A | * | 9/1909 | Huxley ................. F16K 5/0673 |
| | | | | 251/172 |
| 948,571 | A | | 2/1910 | Arp |
| 958,451 | A | | 5/1910 | Washington |
| 1,524,080 | A | * | 1/1925 | Bordo ..................... F16K 3/186 |
| | | | | 137/238 |
| 2,029,777 | A | * | 2/1936 | Kinnaird ............... F16K 49/005 |
| | | | | 137/240 |
| 2,254,472 | A | * | 9/1941 | Dahl ....................... F16K 49/00 |
| | | | | 137/334 |
| 2,315,058 | A | * | 3/1943 | Holt ........................ F16K 5/162 |
| | | | | 137/242 |
| 2,446,196 | A | | 8/1948 | Sitney |
| 2,584,083 | A | * | 1/1952 | Mellett ................... F16K 25/02 |
| | | | | 137/238 |
| 3,266,517 | A | | 8/1966 | Carr |
| 3,831,622 | A | | 8/1974 | Grewer et al. |
| 3,843,091 | A | * | 10/1974 | Gachot ................. F16K 5/0647 |
| | | | | 251/315.05 |
| 3,941,186 | A | | 3/1976 | Schneider |
| 3,943,959 | A | * | 3/1976 | Kirkland ................... B08B 9/00 |
| | | | | 137/238 |
| 4,026,324 | A | * | 5/1977 | King ........................ B01J 4/001 |
| | | | | 137/605 |
| 4,161,959 | A | | 7/1979 | Jansen et al. |
| 4,195,655 | A | * | 4/1980 | Augsburger .......... F16K 49/005 |
| | | | | 137/334 |
| 4,262,638 | A | | 4/1981 | Coulin |
| 4,535,801 | A | * | 8/1985 | Neale .................... F16K 3/0227 |
| | | | | 134/166 C |
| 4,688,594 | A | | 8/1987 | Gardner et al. |
| 4,715,400 | A | | 12/1987 | Gardner et al. |
| 4,809,948 | A | | 3/1989 | Gardner et al. |
| 5,642,751 | A | | 7/1997 | Crawley |
| 5,706,851 | A | | 1/1998 | Lopez-Gomez et al. |
| 6,050,289 | A | | 4/2000 | Flores-Verdugo et al. |
| 8,256,448 | B2 | | 9/2012 | Steele |
| 9,133,960 | B2 | | 9/2015 | Lucas et al. |
| 9,683,678 | B2 | | 6/2017 | Army, Jr. et al. |
| 2015/0129047 | A1 | * | 5/2015 | Gu ........................ B08B 9/0321 |
| | | | | 137/15.04 |
| 2016/0169062 | A1 | | 6/2016 | Knudsen |
| 2016/0281865 | A1 | | 9/2016 | Morgan et al. |
| 2017/0045155 | A1 | | 2/2017 | Army, Jr. et al. |

FOREIGN PATENT DOCUMENTS

| | | |
|---|---|---|
| GB | 2510498 | 8/2014 |
| WO | 2014170209 | 10/2014 |
| WO | 2015150479 | 10/2015 |

OTHER PUBLICATIONS

Velan Inc., "Complete Valve Solutions for the Delayed Coker Industry," 2017, 12 pages.

United States Patent and Trademark Office, "Non-Final Office Action," issued in connection with U.S. Appl. No. 15/378,726, dated Nov. 27, 2017, 18 pages.

U.S. Appl. No. 15/378,726, "Single-Piece Valve Closure Members Having Integral Flow Paths Formed via Additive Manufacturing," filed Dec. 14, 2016, 35 pages.

International Searching Authority, "International Search Report and Written Opinion," issued in connection with International Patent Application No. PCT/US2017/0648120, dated Mar. 29, 2018, 13 pages.

United States Patent and Trademark Office, "Final Office Action," issued in connection with U.S. Appl. No. 15/378,726, dated Jun. 4, 2018, 15 pages.

United States Patent and Trademark Office, "Notice of Allowance," issued in connection with U.S. Appl. No. No. 15/378,726, dated Jul. 18. 2018, 9 pages.

United States Patent and Trademark Office, "Supplemental Notice of Allowance," issued in connection with U.S. Appl. No. 15/378,726, dated Jul. 26, 2018, 2 pages.

* cited by examiner

PURGE APPARATUS FOR USE WITH FLUID VALVES

FIELD OF THE DISCLOSURE

This disclosure relates generally to fluid control valves and, more particularly, to purge apparatus for use with fluid valves.

BACKGROUND

Process control systems employ fluid control valves to regulate process fluids such as water, natural gas, oil, etc. Fluid valves typically control flow of a process fluid by moving a valve plug, a valve ball, a valve disk or any other fluid flow control member via an actuator. Over time, a fluid flow control member can become difficult to move or seize due to agglomeration of one or more substances (e.g., coke) within a fluid valve. As such, some fluid valves are implemented with external steam purge systems to remove such substance(s) when they form on valve components.

SUMMARY

An apparatus disclosed herein includes a stem for a fluid valve. The stem has a first channel extending therethrough to receive a fluid. The apparatus also includes an aperture in fluid communication with the first channel and disposed on an outer surface of the stem or a fluid flow control member coupled to the stem. The aperture is to exhaust the fluid from the first channel toward one or more components of the fluid valve to remove residue.

Another apparatus includes a body for a fluid valve. The body includes a channel extending therethrough to receive a fluid for purging the valve. The channel extends at least partially along an inner wall of the body. The apparatus also includes a port fluidly coupled to the channel and disposed in the body. The port is to guide the fluid from the channel to a valve spring to remove residue.

Another apparatus includes a spring for a fluid valve. The spring is interposed between a valve body and a fluid flow control member to urge a valve seat into sealing engagement with the fluid flow control member. The apparatus also includes a first groove disposed on a first surface of the spring and extending radially relative to an axis of the spring. The first groove is to receive a fluid from a channel extending through the body. The first groove enables the fluid to flow from an outer diameter of the spring to an inner diameter of the spring to remove residue.

Another apparatus includes a ball for a fluid valve. A bore of the ball is to facilitate a flow of a first fluid through the valve. The ball has a first channel extending therethrough to receive a second fluid different from the first fluid. The apparatus also includes an aperture in fluid communication with the first channel and disposed on an outer surface of the ball. The aperture is to exhaust the second fluid from the first channel toward one or more valve components.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
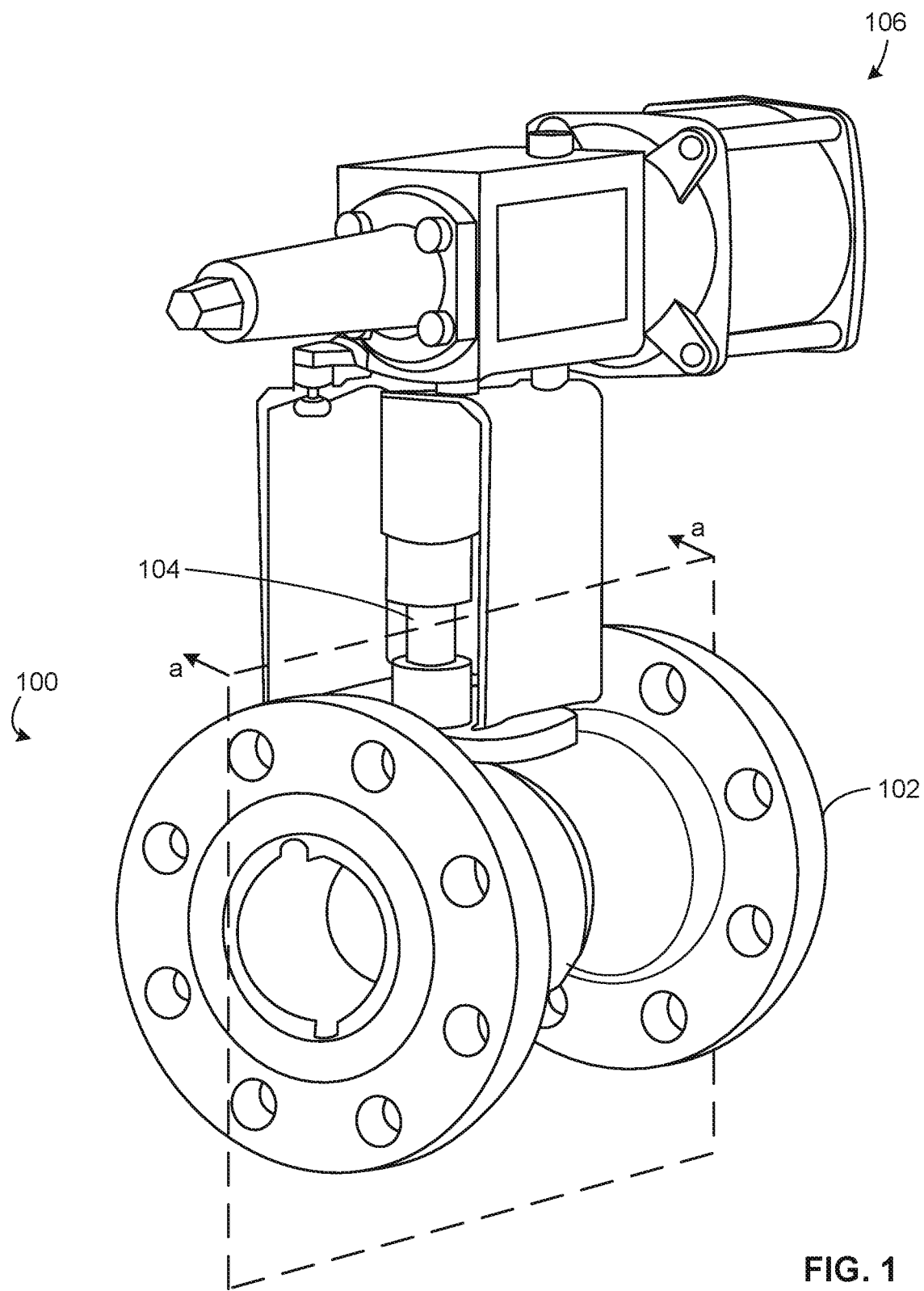
FIG. 1 is a schematic illustration of an example fluid control valve that can implement the teachings of this disclosure.

Known steam purge systems deliver steam to components of a fluid valve via steam supply lines positioned external to the fluid valve. For example, a known steam purge system may include a steam supply line that passes into a body of the fluid valve such that a nozzle on an end of the supply line is positioned proximate to a component (e.g., a stem, a spring, etc.) in the fluid valve. In this manner, solidified substances formed on the components of the fluid valve can be removed by spraying the steam via the nozzle, which improves valve performance. However, these known steam purge systems may fail to sufficiently clean one or more components of the fluid valve due to limited access thereto and/or space in the fluid valve.

Purge apparatus for use with fluid valves are disclosed. Examples disclosed herein facilitate removal of one or more substances or residue (e.g., petroleum coke) from a fluid control valve, thereby improving valve performance. Examples disclosed herein provide one or more example components of the fluid valve that are shaped and/or formed having one or more example channels therein to receive an example fluid (e.g., steam) and direct the fluid to one or more areas in the fluid valve associated with agglomeration. In particular, a disclosed channel is sized, shaped, and/or otherwise configured to enable a sufficient amount of the fluid to flow therethrough and be emitted therefrom at a sufficient velocity. In this manner, disclosed examples enable the removal of residue that may have formed on the one or more disclosed components and/or one or more other components of the fluid valve proximate thereto. As a result, disclosed examples clean one or more valve components that would have otherwise been inaccessible by the above-noted known steam purge systems.

Some disclosed examples provide an example valve stem to facilitate purging the fluid valve. In such examples, the disclosed stem includes a first example channel (sometimes referred to as a primary channel) extending therethrough to receive the example fluid via an inlet disposed on the stem. The stem also includes at least an aperture disposed on an outer surface thereof positioned proximate one or more components (e.g., a packing housing, a wall of the bore, etc.)

of the fluid valve. In particular, the aperture of the stem is in fluid communication with the first channel to exhaust and/or direct the fluid from the channel toward the component(s), thereby removing residue that may have formed thereon and/or proximate thereto. Further, in some examples, the example valve stem is implemented with one or more additional apertures disclosed in greater detail below.

Some disclosed examples provide an example valve ball to facilitate purging the valve. In such examples, the disclosed valve ball includes at least an example second or primary channel (e.g., the first channel of the stem) extending therethrough to receive the example fluid (e.g., via the inlet of the stem). The valve ball also includes at least an aperture disposed on an outer surface thereof positioned proximate to one or more components (e.g., a downstream valve seat, an upstream valve seat, a valve spring, etc.) of the valve. In particular, the aperture of the valve ball is in fluid communication with the second channel to exhaust and/or direct the fluid from the second channel toward the component(s), thereby enabling the removal of residue that may have formed thereon and/or proximate thereto.

Some disclosed examples provide an example valve body to facilitate purging the fluid valve. In such examples, the disclosed valve body includes at least an example third channel or primary channel extending therethrough to receive the example fluid (e.g., via an inlet of the body). The third channel of the body extends along at least a portion of an inner wall of the body. In particular, an example port is in fluid communication with the third channel and positioned proximate to a spring (e.g., one or more Belleville washers, a coil spring, a wave spring, etc.) of the fluid valve to exhaust and/or direct the fluid from the third channel toward the spring. Further, in some examples, the example valve body is implemented with one or more additional ports fluidly coupled with the third channel, which is disclosed in greater detail below.

Some disclosed examples provide an example valve spring to facilitate purging the valve. In such examples, the disclosed valve spring includes at least an example groove disposed thereon to receive the example fluid (e.g., via the example third channel of the valve body). In particular, the groove extends radially (e.g., inward or outward) relative to an axis of the spring to enable the example fluid to flow from an outer radius of the spring to an inner radius of the spring, thereby removing residue. Further, in some examples, the example valve spring is implemented with one or more additional grooves disclosed in greater detail below.

In some examples, one or more of the disclosed apertures and/or one or more of the disclosed channels are configured to increase a velocity of the example fluid to facilitate residue removal. In some examples, at least a portion of an example aperture has a cross-sectional area that is smaller than a cross-sectional area of an example primary channel (e.g., the first example channel of the disclosed valve stem, the second example channel of the disclosed valve ball, and/or the third example channel of the disclosed valve body), thereby increasing the velocity of the fluid. Some disclosed examples provide an intermediate channel (sometimes referred to as a secondary channel) fluidly coupled between an example aperture and an example primary channel to similarly increase the velocity of the fluid. In particular, at least a portion of the secondary channel has a cross-sectional area that is smaller than a cross-sectional area of the primary channel, thereby increasing the velocity of the fluid. As used herein, the terms "primary channel" and "secondary channel" or "intermediate channel" refer to respective first and second channels, where at least a portion of the second channel has a cross-sectional area that is smaller than a cross-sectional area of the first channel.

FIG. 1 is a schematic illustration of an example fluid control valve 100 that can implement the teachings of this disclosure. The example fluid valve 100 of FIG. 1 includes a body 102, a shaft or stem 104, and an actuator (e.g., an electric actuator, a pneumatic actuator, etc.) 106. According to the illustrated example of FIG. 1, the fluid valve 100 is a rotary valve such as, for example, a ball valve (e.g., a floating ball valve). However, examples disclosed herein can be implemented in any other suitable fluid valve such as, for example, a butterfly valve, a sliding stem fluid valve, a gate valve, etc.

To control a flow of a first fluid (e.g., a process fluid such as oil, water, natural gas, etc.) through the fluid valve 100, the valve stem 104 moves (e.g., rotates, slides, etc.), thereby causing a fluid flow control member (e.g., a valve ball, a valve disk, a valve plug, etc.) in the fluid valve 100 to move. In some examples, the valve 100 is implemented with means for moving the stem 104. For example, as shown in FIG. 1, the actuator 106 is operatively coupled to the stem 104 to facilitate moving the stem 104. In such examples, the actuator 106 controls the flow of the first fluid based on one or more commands received from a process control network associated with the fluid valve 100. In some examples, the valve stem 104 may be manually operated.

The valve stem 104 of the illustrated example is operatively coupled to the actuator 106 and extends through at least a portion of the body 102. In particular, the valve stem 104 rotates to open and close the fluid valve 100. When the fluid valve 100 of FIG. 1 is closed, the first fluid is substantially prevented from flowing through the fluid valve 100. Conversely, when the fluid valve 100 is open, the first fluid is enabled to flow through the fluid valve 100.

Figure 2:
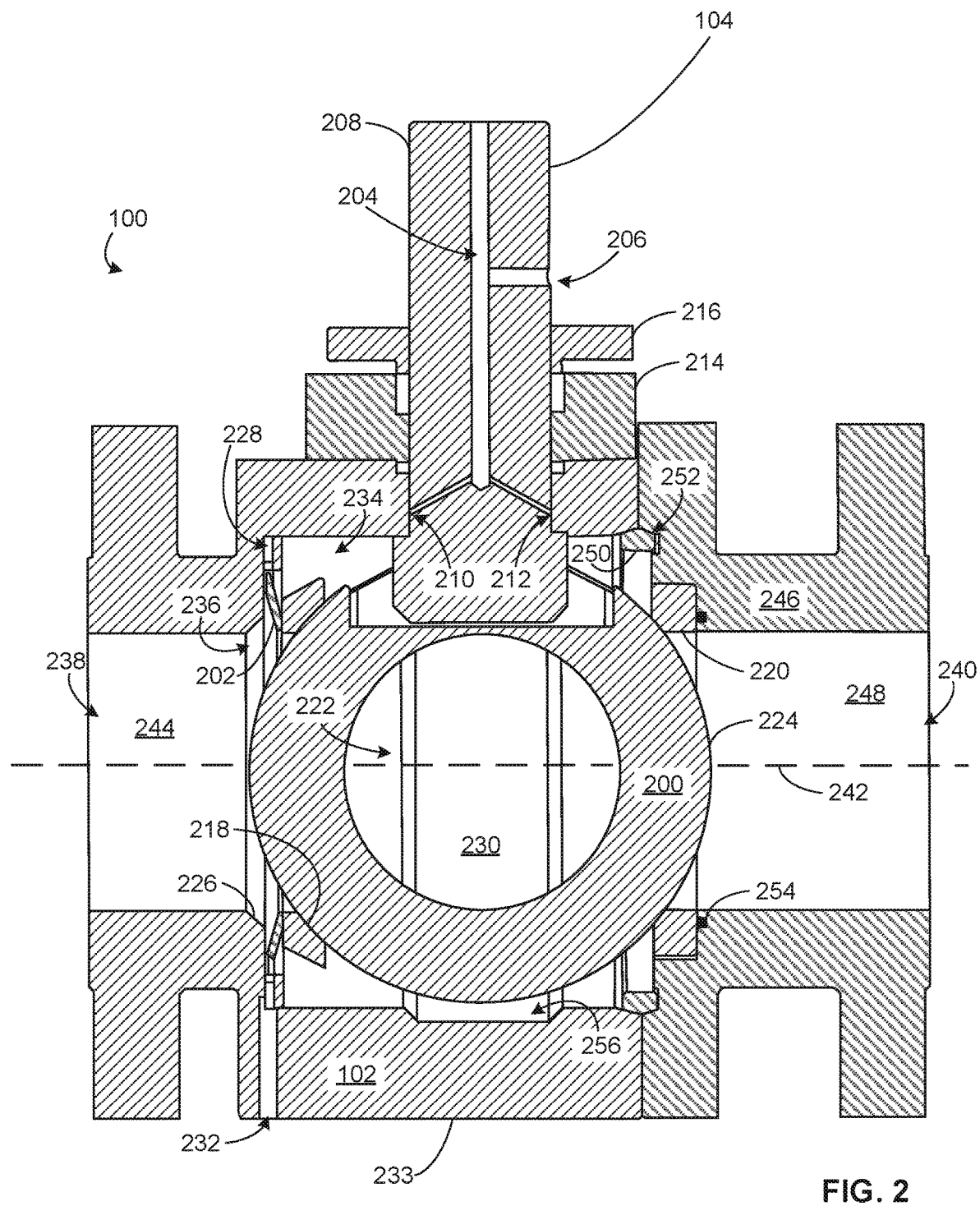
FIG. 2 is a cross-sectional view of the example fluid valve of FIG. 1 along line a-a and shows an example valve body, an example valve stem, an example valve ball, and an example valve spring in accordance with examples disclosed herein.

FIG. 2 is a cross-sectional view of the example fluid valve 100 of FIG. 1 along line a-a and shows the valve body 102, the valve stem 104, a valve ball 200, and a valve spring 202 in accordance with examples disclosed herein. As will be disclosed in greater detail below in connection with FIGS. 3-9, one or more of the valve body 102, the valve stem 104, the valve ball 200, and/or the valve spring 202 facilitate cleaning the valve 100. In particular, one or more of the valve body 102, the valve stem 104, the valve ball 200, and/or the valve spring 202 enable the removal of residue (e.g., petroleum coke, etc.) via a second fluid (e.g., steam) that is, in some examples, different from the first fluid.

The valve stem 104 of FIG. 2 includes a first example channel 204 (sometimes referred to as a primary channel) extending through the valve stem 104. The first channel 204 of FIG. 2 receives the second fluid from a fluid supply external to the fluid valve 100. In particular, the stem 104 includes an example inlet (e.g., an aperture) 206 in fluid communication with the first channel 204 such that the second fluid can flow from the inlet 206 to the first channel 204. The inlet 206 of FIG. 2 is disposed external to the fluid valve 100 and/or on an outer surface (e.g., a circumferential surface) 208 of the stem 104.

As will be discussed in further below in connection with FIG. 3, the first channel 204 is fluid communication with one or more example apertures 210, 212 (two of which are shown in this example) disposed on the outer surface 208 of the stem 104. In particular, the aperture(s) 210, 212 exhaust and/or direct the second fluid from the first channel 204 toward one or more components of the fluid valve 100. For example, as shown in the example of FIG. 2, each aperture 210, 212 is aligned to an uppermost (in the orientation of FIG. 2) portion of the valve body 102 to remove residue thereon and/or proximate thereto via the second fluid, thereby improving performance of the fluid valve 100. That is, a torque required to move the stem 104 decreases as a result of removing the residue from the valve 100. In other examples, the aperture(s) 210, 212 may similarly align to one or more other portions of the body 102 and/or components of the valve 100 to remove residue therefrom and/or proximate thereto such as, for example, a packing housing 214, a packing follower 216, etc.

According to the illustrated example, the valve stem 104 is coupled to the valve ball 200 via one or more fasteners and/or fastening techniques or methods. Thus, in some examples, the stem 104 and the ball 200 may be separate components. However, in other examples, the stem 104 and the ball 200 may be formed together as a unitary component.

The valve ball 200 of FIG. 2 is positioned in the body 102 of the valve 100 between a first valve seat (e.g., an upstream valve seat) 218 and a second valve seat (e.g., a downstream valve seat) 220. In particular, the valve spring 202 urges one or more of the seats 218, 220 into sealing engagement with the ball 200 to prevent leaks during valve use. In some examples, the first fluid flows through a bore 222 in the ball 200 and/or does not flow around an outer surface (e.g., a circumferential surface and/or a spherical surface) 224 of the ball 200.

The valve spring 202 of FIG. 2 is interposed between a shoulder 226 of the body 102 and the first valve seat 218 such that a biasing force generated by the spring 202 is imparted on the first valve seat 218. While the example of FIG. 2 depicts the spring 202 as a single Belleville washer, in other examples, one or more other springs (e.g., multiple Belleville washers, a wave spring, a coil spring, etc.) may be used to generate the biasing force in addition or alternatively to the spring 202 of the illustrated example.

In some examples, as will be discussed further below in connection with FIGS. 8 and 9, the valve body 102 includes a second channel 228 disposed therein to receive the second fluid, which facilitates removing residue from the spring 202. In particular, the second channel 228 of the body 102 extends at least partially along an inner wall (e.g., a circumferential wall) 230 of the body 102 and/or at least partially around the spring 202 to guide the second fluid to one or more portions of the spring 202. More particularly, the second channel 228 of the body 102 includes one or more ports 800, 802, 804 (shown in FIG. 8) fluidly coupled thereto to exhaust and/or direct the second fluid from the second channel 228 toward the spring 202.

According to the illustrated example, the second channel 228 of the body 102 receives the second fluid via an example inlet 232 that is in fluid communication with the second channel 228 and disposed on an outer surface 233 of the body 102. In the example of FIG. 2, the inlet 232 extends from the outer surface 233 to the second channel 228. As shown in FIG. 2, the second channel 228 is at least partially (e.g., entirely) formed by the body 102, as discussed further below in connection with FIG. 8. In some examples, the second channel 228 is not formed by the body 102 and/or is formed by one or more components that is/are separate from the body 102 such as, for example, an example plate (e.g., an annular disk) 808 (shown in FIG. 8) that is coupled to the body 102.

In some examples, the second channel 228 provides the second fluid to a first example space 234 in the body 102 associated with an example first side 910 (shown in FIG. 9) of the spring 202. The first space 234 of FIG. 2 is at least partially defined by one or more of the inner wall 230 of the body 102, the valve stem 104, the first valve seat 218, the second valve seat 220, and/or the spring 202. In particular, as disclosed further below, the spring 202 of FIG. 2 is sized, shaped, and/or otherwise configured to enable the second fluid to flow from the first space 234 to a second space 236 in the body 102 associated with an example second side 912 (shown in FIG. 9) of the spring 202, thereby removing residue that may have formed on and/or proximate to the spring 202. The second space 236 of FIG. 2 is at least partially defined by one or more of the shoulder 226 of the body 102, the first valve seat 218, the second valve seat 220, and/or the spring 202.

In operation, the valve stem 104 imparts a force and/or a torque (e.g., generated by the actuator 106) on the fluid flow control member 200 to open and close the fluid valve 100. As shown in the example of FIG. 2, the valve ball 200 is in a substantially closed position (i.e., the valve 100 is substantially closed). In particular, the bore 222 of the ball 200 does not align to an inlet 238 and/or an outlet 240 of the valve 100. As such, at least a portion of the outer surface 224 of the ball 200 is preventing the first fluid from flowing through the valve 100 by sealingly engaging the valve seat(s) 218, 220. In some examples, as the torque of the stem 104 moves the ball 200 toward an open position, the bore 222 aligns to both the inlet 238 and the outlet 240, thereby enabling the first fluid to flow into the valve 100 via the inlet 238 and out of the valve 100 via the outlet 240.

The inlet 238 of the illustrated example is an opening extending through the body 102 along an axis 242 extending along a fluid flow path through the valve 100. In some examples, the inlet 238 is formed by the body 102 and defines an inner wall (e.g., a circumferential wall) 244 thereof. The outlet 240 of the illustrated example is an opening extending along the axis 242 through an example adapter 246 that is coupled to the body 102. The outlet 240 is formed by the adapter 246 and defines an inner wall (e.g., a circumferential wall) 248 thereof.

The adapter 246 of the illustrated example is coupled (e.g., removably coupled) to the body 102 via one or more fasteners and/or fastening methods or techniques. In some examples, a first example gasket or seal 250 is coupled between and/or sealingly engaged with the adapter 246 and the body 102 to prevent leaks. In particular, the seal 250 of FIG. 2 is disposed at least partially in an example seal gland 252, which is formed by the body 102 and the adapter 246 in this example. In some examples, the seal gland 252 is formed by only the body 102 or the adapter 246.

In some examples, a second example gasket or seal 254 is disposed between the second valve seat 220 and the adapter 246 to prevent leaks. In particular, the second seal 254 of FIG. 2 sealingly engages both the second valve seat 220 and the adapter 246, for example, as a result of the biasing force generated by the example spring 202.

In some examples, the example valve body 102 of FIG. 2 includes an example groove (sometimes referred to as a relief cavity) 256 proximate to the outer surface 224 of the valve ball 200. The groove 256 of the illustrated example is disposed on and/or formed by the inner wall 230 of the body 102. In some examples, the groove 256 receives at least a portion of the valve ball 200.

Figure 3:
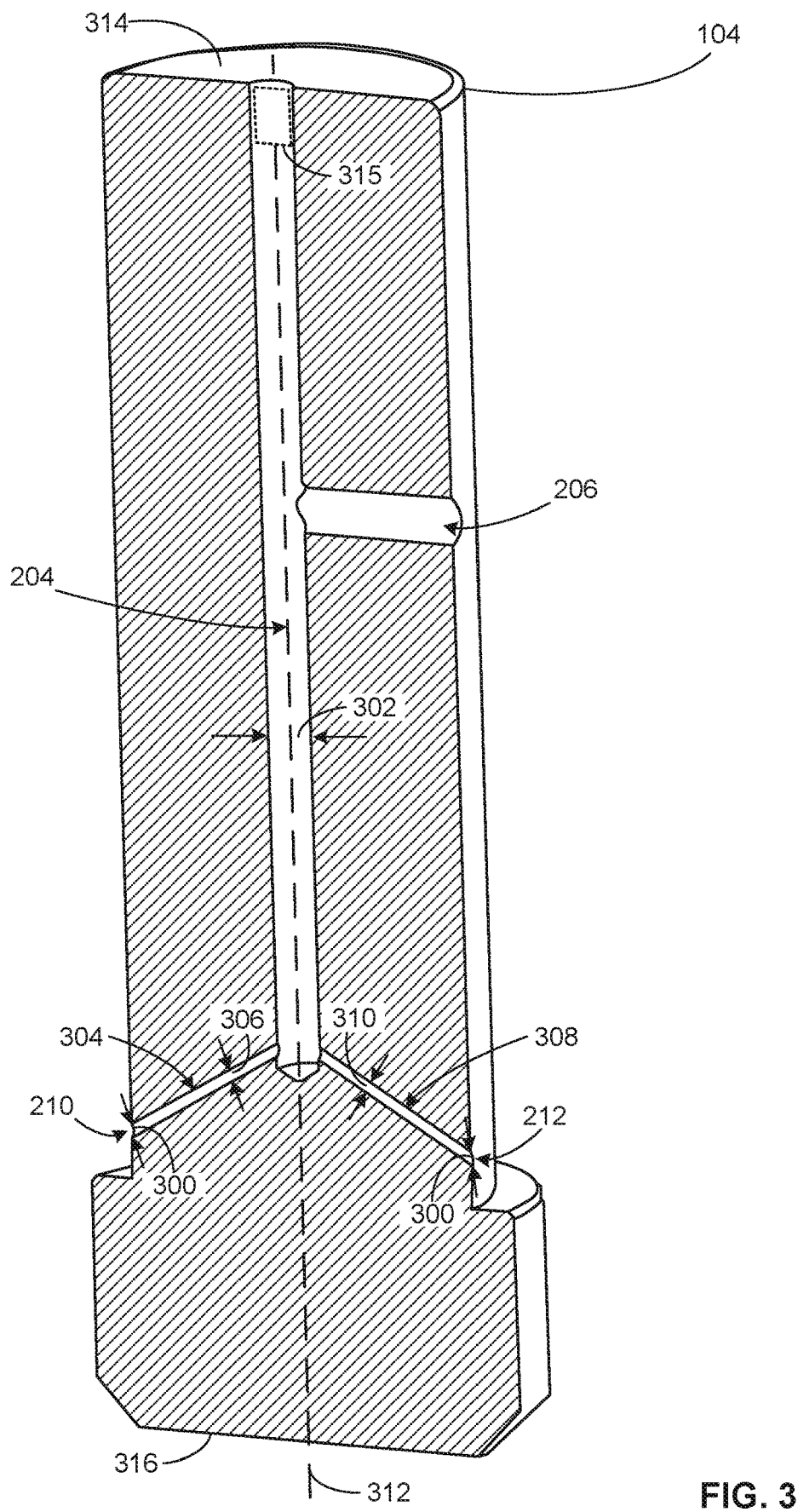
FIG. 3 is a detailed view of the example valve stem of FIG. 2.

FIG. 3 is a detailed view of the valve stem 104 of FIGS. 1 and 2 and shows the first channel 204 fluidly coupled to the apertures 210, 212. In some examples, to increase a velocity of the second fluid through an aperture, one or more of the apertures 210, 212 of the stem 104 have a cross-sectional area 300 that is smaller than a cross-sectional area 302 of the first channel 204. As a result, the velocity of the second fluid increases before being exhausted by the aperture(s) 210, 212.

In some examples, to similarly increase the velocity of the second fluid, the stem 104 includes another channel (sometimes referred to as a secondary channel) interposed between an aperture 210, 212 to similarly increase the velocity of the second fluid. For example, as shown in FIG. 3, the stem 104 includes a third channel 304 fluidly coupled between and/or extending between the first aperture 210 and the first channel 204 to transmit the second fluid therebetween. In particular, at least a portion of the third channel 304 has a cross-sectional area 306 that is smaller than the cross-sectional area 302 of the first channel 204. Similarly, as shown in FIG. 3, the stem 104 also includes a fourth channel (e.g., similar or different relative to the third channel 304) 308 fluidly coupled between and/or extending between the second aperture 212 and the first channel 204. In such examples, the fourth channel 308 includes a cross-sectional area 310 that is smaller than the cross-sectional area 302 of the first channel 204.

In some examples, the first channel 204, one or more of the apertures 210, 212, and/or one or more of the secondary channels 304, 308 associated with the stem 104 are sized, shaped, and/or configured to enable a sufficient amount of the second fluid to flow through the aperture(s) 210, 212 at a sufficient velocity to effectively remove residue formed within the valve 100. As previously mentioned, in some examples, the stem 104 is implemented with additional or fewer apertures (e.g., similar or different relative to the apertures 210, 212). Additionally or alternatively, in some examples, the stem 104 is implemented with additional or fewer secondary channels (e.g., similar or different relative to the channels 304, 308).

The example apertures 210, 212 of the illustrated example are radially distributed and/or spaced relative to an axis 312 of the stem 104. In particular, the apertures 210, 212 are positioned on the stem 104 such that the apertures 210, 212 align to one or more components of valve 100 when the stem 104 is positioned in the body 102, which enables the second fluid to flow out of the apertures 210, 212 toward the component(s) and remove residue therefrom. In some examples, the apertures 210, 212 align to a wall or surface of one or more of the body 102, the packing housing 214, and/or the packing follower 216. Further, in some examples, the stem 104 is implemented with one or more additional apertures that align to more than one (e.g., each) of the valve components when the stem 104 is positioned in the body 102.

In the illustrated example of FIG. 3, the first channel 204 extends through an uppermost (in the orientation of FIG. 3) surface (e.g., a flat or level surface) 314 of the stem 104, which may facilitate manufacturing the stem 104. In such examples, the second fluid is prevented from flowing out of the first channel 204 at the surface 314 of the stem 104, for example, via an example plug 315 disposed in the first channel 204. In some examples, one or more of the channels 204, 304, 308 has/have a substantially constant cross-sectional area along a length of the channel(s) 204, 304, 308.

While the example of FIG. 3 depicts the first channel 204 as extending from respective ends of the example channels 304, 308 and out through the surface 314 of the stem 104, in other examples, the first channel 204 extends through the stem 104 differently and/or along one or more other portions thereof. In some examples, the first channel 204 extends only to the inlet 206 of the stem 104 and not out through the surface 314. In some examples, the first channel 204 extends through a bottommost (in the orientation of FIG. 3) surface 316 of the stem 104 and/or into the aforementioned valve ball 200 to provide the second fluid thereto. Thus, in some examples, the first channel 204 extends along the entire length of the stem 104.

Figure 4:
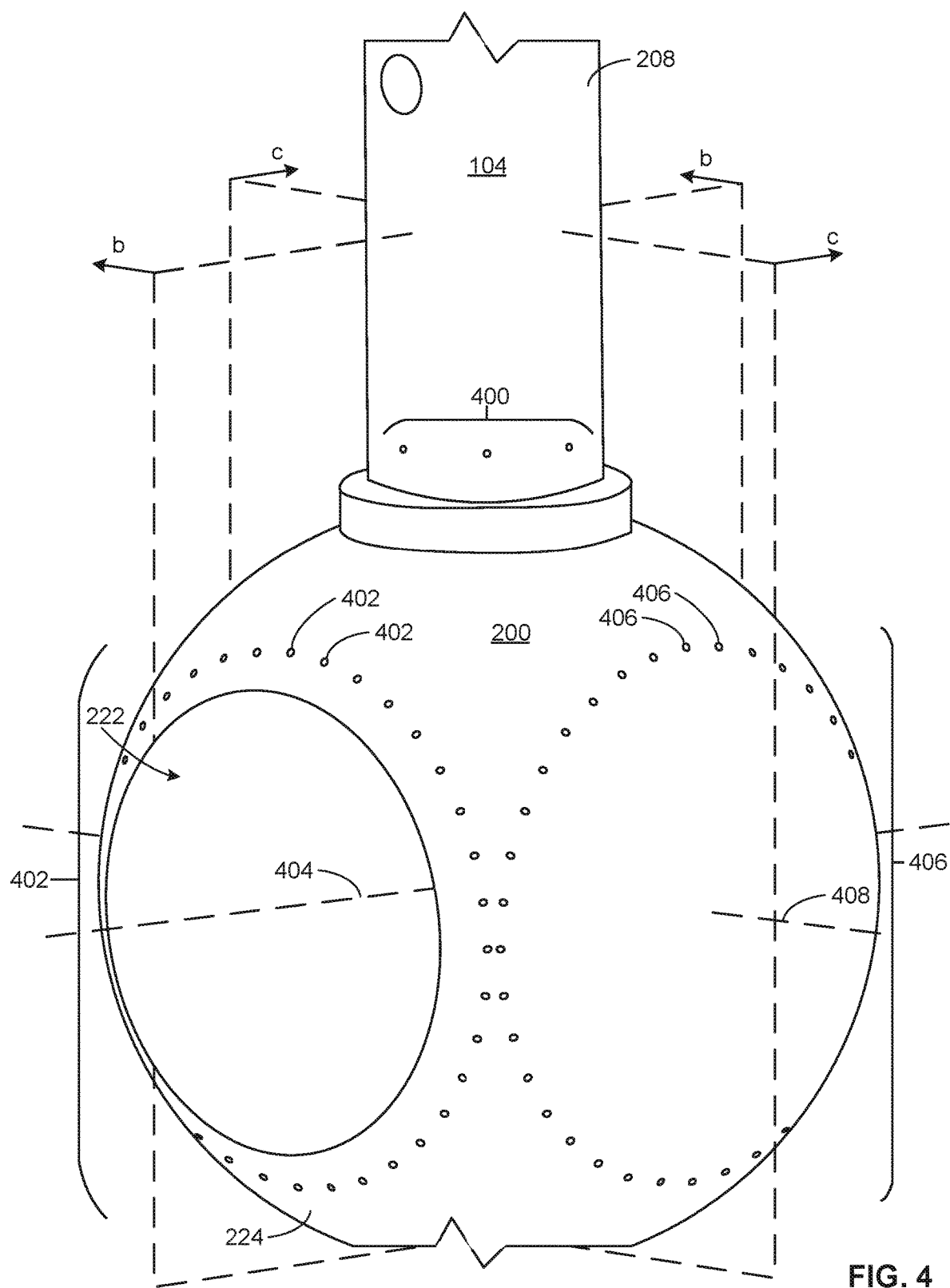
FIG. 4 is a detailed view of the example valve stem and the example valve ball of FIG. 2 showing example aperture configurations.

FIG. 4 is a detailed view of the valve stem 104 and the valve ball 200 showing example aperture configurations. The stem 104 of the illustrated example includes first example apertures (e.g., including the first aperture 210 and/or the second aperture 212) 400 disposed on the outer surface 208 thereof, each of which is fluidly coupled to the first channel 204 in the stem 104. In particular, the first apertures 400 of FIG. 4 are spaced, positioned, and/or configured to align to at least one component of the valve 100 to facilitate the removal of residue therefrom and/or proximate thereto. Similarly, in some examples, the stem 104 includes one or more other groups of apertures positioned differently on the stem 104, each of which may align to at least one component of the valve 100.

According to the illustrated example of FIG. 4, the valve ball 200 includes second example apertures 402 disposed on the outer surface 224 thereof, each of which is fluidly coupled to the first channel 204 in the stem 104. The second apertures 402 of FIG. 4 are radially distributed relative to a first example axis 404 of the ball 200 such that the second apertures 402 form a shape (e.g., a substantially circular shape). The first axis 404 of FIG. 4 is centrally disposed in the bore 222 of the ball 200 through which the first fluid is to flow. As shown in FIG. 4, the second apertures 402 surround the bore 222. In particular, the second apertures 402 of FIG. 4 are spaced, positioned, and/or configured to align to a valve seat (e.g., the first valve seat 218 and/or the second valve seat 220) when the ball 200 is in or proximate to the open position (i.e., when the fluid valve 100 is substantially open).

In some examples, the example valve ball 200 includes one or more other groups of apertures that is/are similar or different relative to second apertures 402. For example, as shown in the example of FIG. 4, the ball 200 includes third example apertures 406 disposed on the outer surface 224 thereof, each of which is fluidly coupled to the first channel 204. The third apertures 406 of FIG. 4 are radially distributed relative to a second example axis 408 of the ball 200 such that the third apertures 406 form a shape (e.g., a substantially circular shape). The second axis 408 of FIG. 4 intersects the bore 222 and/or is perpendicular relative to the first axis 404. In some examples, the first and second axes 404, 408 of the ball and the axis 312 of the stem 104 are perpendicular relative to each other. In particular, the third apertures 406 of the illustrated example align to the valve seat when the ball 200 is in or proximate to the closed position (i.e., when the fluid valve 100 is substantially closed).

Figure 5:
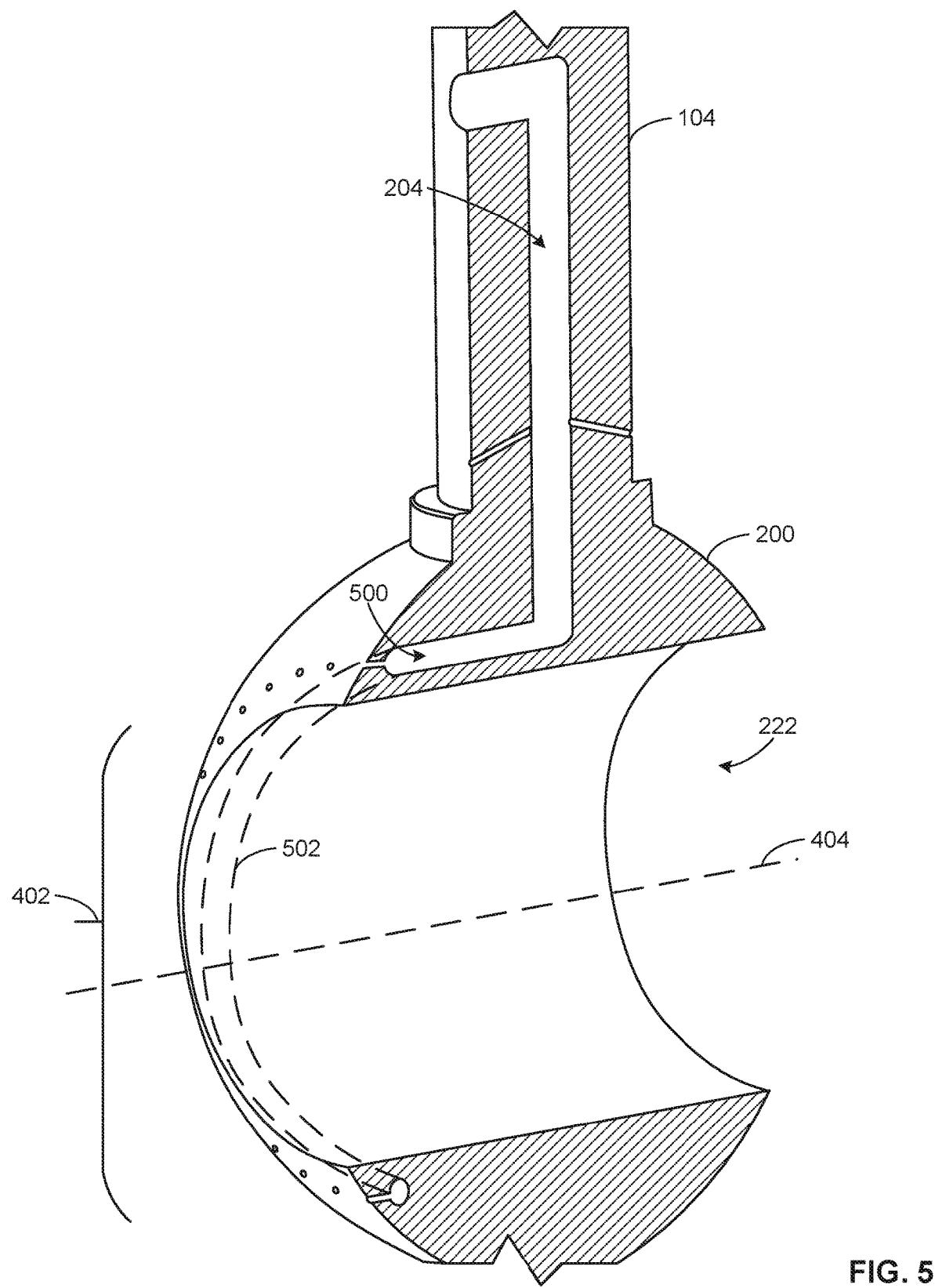
FIG. 5 is a cross-sectional view of the example valve stem and the example valve ball of FIG. 4 along line b-b.

FIG. 5 is a cross-sectional view of the example valve stem 104 and the example valve ball 200 of FIG. 4 along line b-b. According to the illustrated example of FIG. 5, an example fifth channel (e.g., a primary channel) 500 extends at least partially through the valve ball 200 to provide the second fluid to one or more apertures disposed on the ball 200 such as, for example, one or more of the second example apertures 402. In particular, the fifth channel 500 of FIG. 5 extends along the bore 222 of the ball 200 and/or parallel relative to the first axis 404. As shown in the example of FIG. 5, the example fifth channel 500 is in fluid communication with the first channel 204 of the stem 104 to receive the second fluid therefrom. In some examples, the fifth channel 500 is the first channel 204 or separate from the first channel 204.

In some examples, the fifth channel 500 surrounds at least a portion of the bore 222. For example, as shown in FIG. 5, a portion (e.g., a circular and/or curved portion) 502 the fifth channel 500 surrounds the entire bore 222 and/or is positioned adjacent to each of the second apertures 402, as represented by the dotted/dashed lines of FIG. 5.

Figure 6:
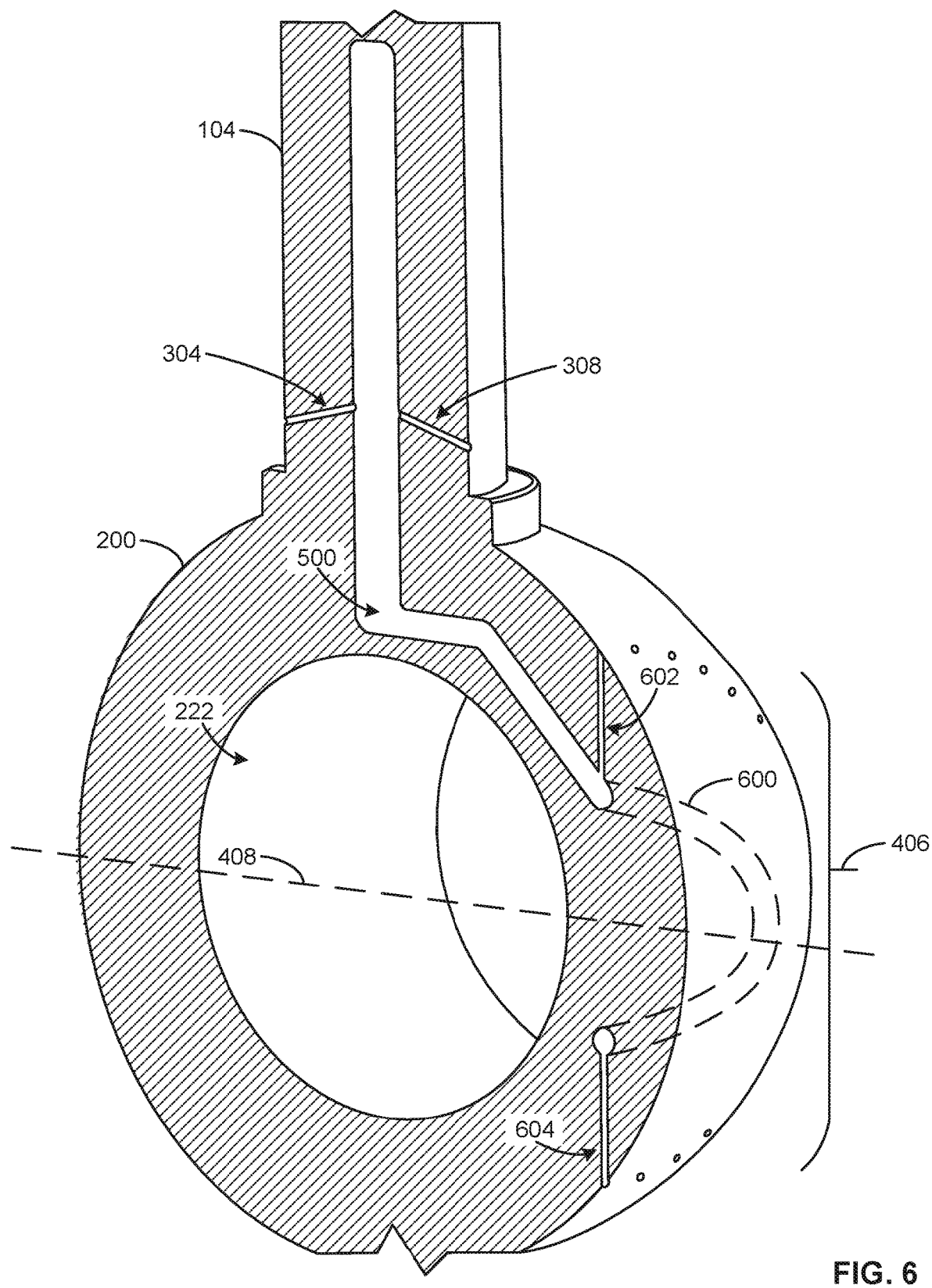
FIG. 6 is a cross-sectional view of the example valve stem and the example valve ball of FIG. 4 along line c-c.

FIG. 6 is a cross-sectional view of the example valve stem 104 and the example valve ball 200 of FIG. 4 along line c-c. According to the illustrated example of FIG. 6, the fifth channel 500 extends at least partially through the valve ball 200 to provide the second fluid to one or more apertures disposed on the ball 200 such as, for examples, one or more of the third apertures 406. In particular, the fifth channel 500 of FIG. 6 extends partially around the bore 222 of the ball 200 and/or parallel relative to the second axis 408.

In some such examples, the fifth channel 500 surrounds at least a portion of the second axis 408 of the ball 200. For example, as shown in FIG. 6, a portion (e.g., a circular and/or curved portion) 600 of the fifth channel 500 surrounds the second axis 408 and/or is positioned adjacent to each of the third apertures 406, as represented by the dotted/dashed lines of FIG. 6.

In some examples, similar to the third channel 304 and/or the fourth channel 308 of the stem 104, the ball 200 includes one or more secondary channels 602, 604 (two of which are shown in this example) fluidly coupled between and/or extending between the fifth channel 500 and one or more of the third apertures 406 to increase the velocity of the second fluid before the second fluid is exhausted out of the ball 200. Further, in some examples, the ball 200 includes one or more secondary channels fluidly coupled between the fifth channel 500 and one or more other apertures of the ball 200 (e.g., one or more of the second apertures 402).

In some examples, the fifth channel 500, one or more of the apertures 402, 406, and/or one or more of the secondary channels 602, 604 associated with the valve ball 200 are sized, shaped, and/or configured to enable a sufficient amount of the second fluid to flow through the aperture(s) 402, 406 at a sufficient velocity to effectively remove residue.

Figure 7:
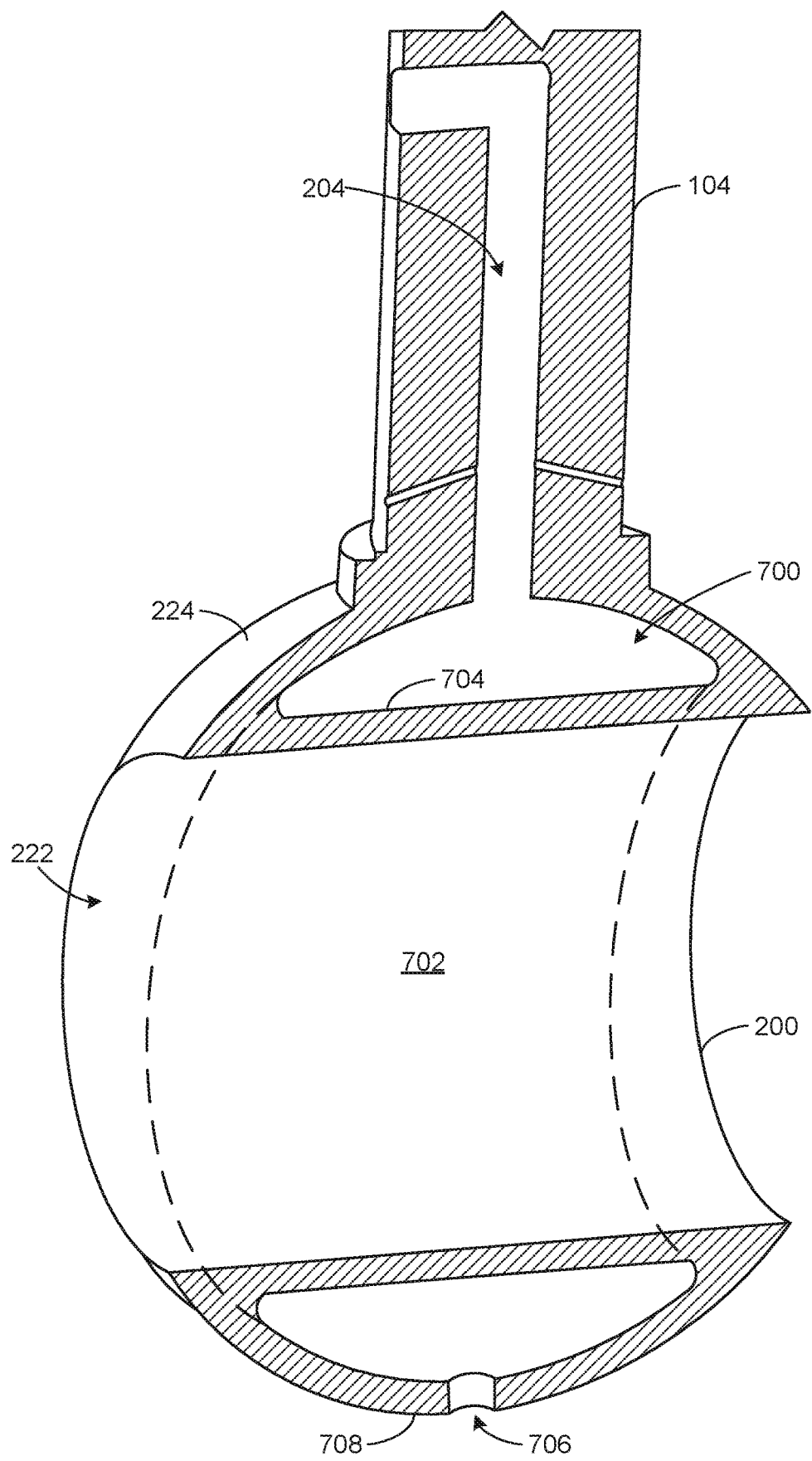
FIG. 7 is another cross-sectional view of the example valve stem and the example valve ball of FIG. 4 along line b-b.

FIG. 7 is another cross-sectional view of the example valve stem 104 and the example valve ball 200 of FIG. 4 along line b-b. In particular, the valve ball 200 of the illustrated example includes an example cavity 700 in fluid communication with the first channel 204 of the stem 104 to facilitate temperature control of the valve ball 200 via the second fluid. In some examples, by increasing a temperature of the ball 200 and/or maintaining the temperature, likeliness of residue forming on and/or near the ball 200 is reduced during valve use.

According to the illustrated example, the cavity 700 is positioned between an inner surface (e.g., a circumferential surface) 702 of the bore 222 and the outer surface 224 of the ball 200. The cavity 700 defines an inner surface 704 of the ball 200 having a significantly large area (e.g., relative to an inner surface area provided by the first channel 204), which facilitates heat transfer (e.g., convection heat transfer) between the second fluid and the ball 200. Stated differently, the area of the surface 704 improves or increases a rate at which the temperature of the ball 200 increases via the second fluid (i.e., improves a heating rate of the ball 200). In some examples, the cavity 700 of FIG. 7 extends at least partially around the bore 222. As shown in the example of FIG. 7, the cavity 700 extends around the entire bore 222, as represented by the dotted/dashed lines of FIG. 7.

In some examples, to facilitate a flow of the second fluid through the cavity 700, the valve ball 200 of FIG. 7 includes an example outlet (e.g., an aperture) 706 in fluid communication with the cavity 700 and disposed on the outer surface 224. In the example of FIG. 7, the outlet 706 is positioned at a bottommost (in the orientation of FIG. 7) portion 708 of the ball 200 and/or opposite the stem 104 to exhaust the second fluid from the cavity 700 (e.g., into the groove 256 and/or the first space 234 in the valve body 102). In such examples, by increasing a flow rate of the second fluid through the cavity 700 via the outlet 706, the heating rate of ball 200 further improves or increases.

Figure 8:
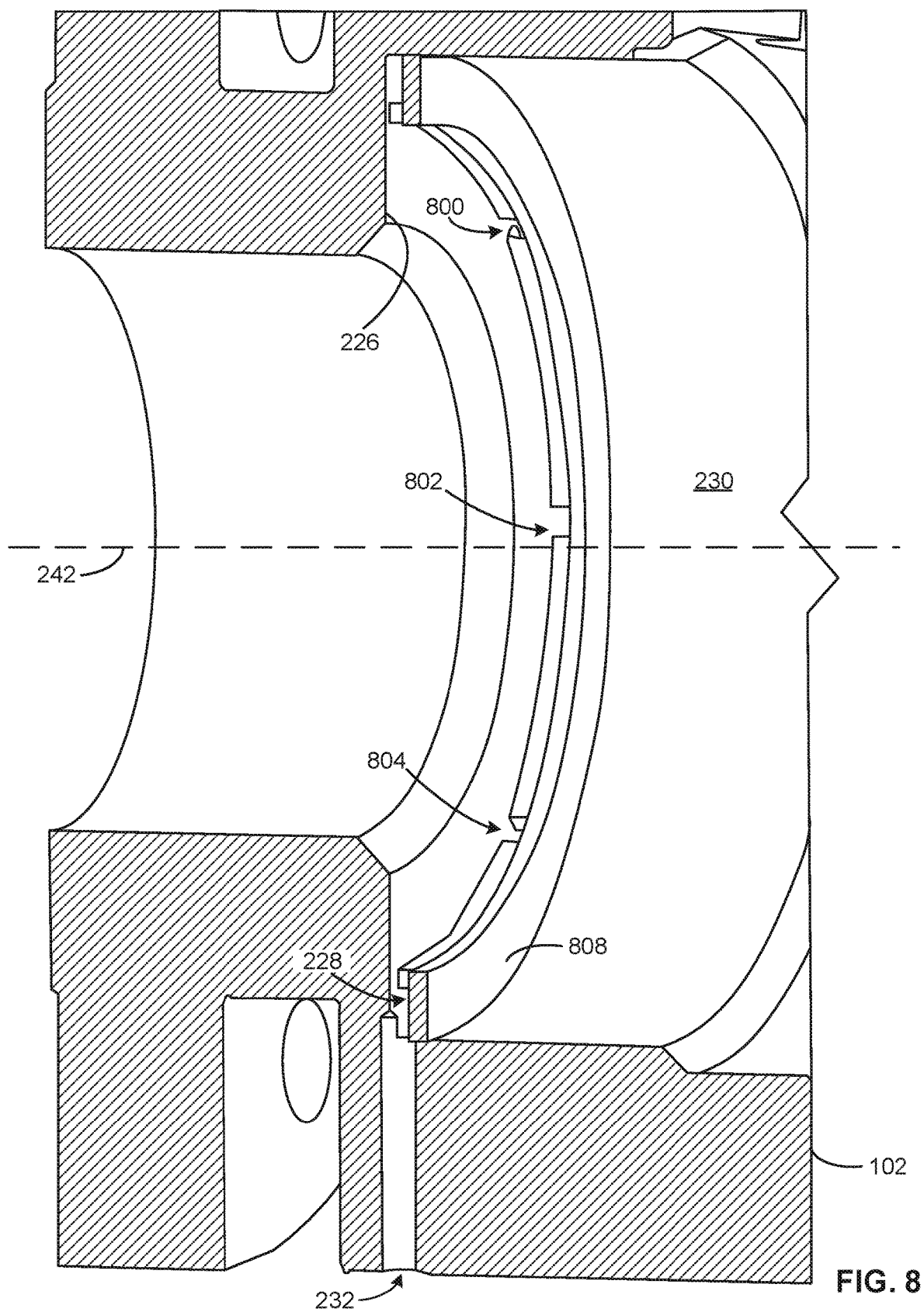
FIG. 8 is a detailed partial view of the example valve body of FIG. 2 and shows an example channel in accordance with disclosed examples.

FIG. 8 is a detailed partial view of the example valve body 102 of FIG. 2 and shows the second channel 228 therein. The second channel 228 of the illustrated example extends along at least a portion of the inner wall 230 of the body 102 and/or adjacent to the shoulder 226. In some examples, the second channel 228 extends around the entire inner wall 230.

As previously mentioned, to exhaust and/or direct the second fluid out of the second channel 228 toward the valve spring 202, the second channel 228 includes one or more of the aforementioned ports (e.g., apertures) 800, 802, 804 fluidly coupled thereto, three of which are shown in this example. The ports 800, 802, 804 of the illustrated example are radially distributed relative to the axis 242 of the body 102. In some examples, one or more of the ports 800, 802, 804 extend radially inward relative to the axis 242 and/or toward the spring 202.

In some examples, similar to the aforementioned example aperture(s) depicted in connection with the valve stem 104 and the valve ball 200, the ports 800, 802, 804 are sized, shaped, and/or otherwise configured to increase a velocity of the second fluid before exhausting the second fluid therethrough. For example, a port 800, 802, 804 can include a cross-sectional area that is smaller than a cross-sectional area of the second channel 228. In some examples, a port 800, 802, 804 is in fluid communication with a secondary channel fluidly coupled between and/or extending between the port 800, 802, 804 and the second channel 228 to increase the velocity of the second fluid.

As shown in FIG. 8, the second channel 228 of FIG. 8 is at least partially formed by the body 102. In some examples, the body 102 forms the second channel 228 with one or more other components. For example, as shown in FIG. 8, the body 102 forms the channel 228 with the aforementioned example plate 808, which is depicted as an annular disk. According to the illustrated example, the plate 808 is coupled to the body 102 via one or more fasteners and/or fastening methods or techniques such as, for example, via a weld (e.g., a seal weld). In some other examples, the example second channel 228 is a separate component that is coupled to the body 102 and fluidly coupled to the inlet 232 of the body 102.

Figure 9:
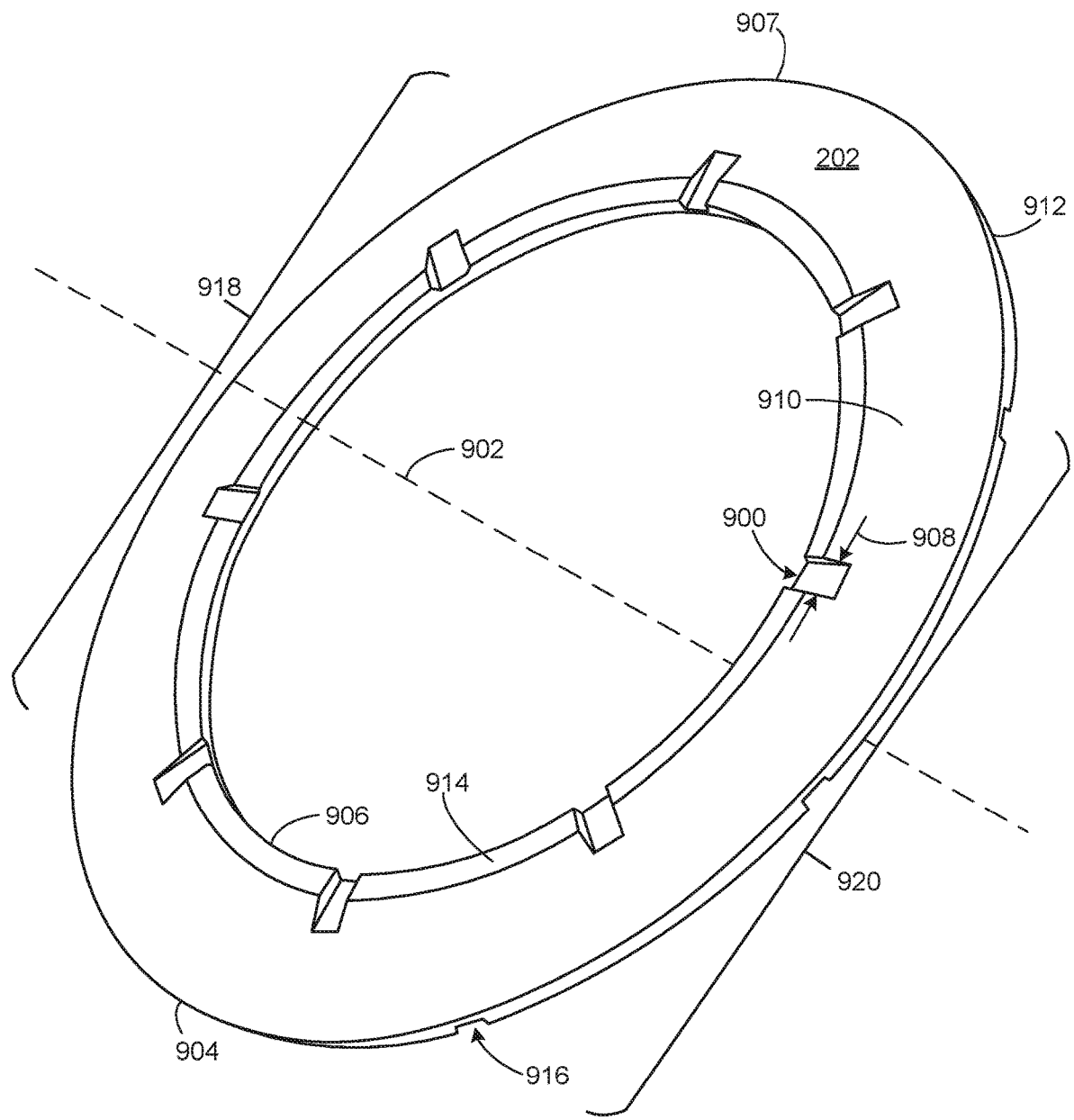
FIG. 9 is a detailed view of the example valve spring of FIG. 2 showing an example groove in accordance with disclosed examples.

FIG. 9 is a detailed view of the example valve spring 202 of FIG. 2 showing an example first groove 900. The first groove 900 is disposed on the spring 202 and extends radially (e.g., inward or outward) relative to an axis 902 of the spring 202. In particular, the first groove 900 facilitates removal of residue associated with the spring 202 by enabling the second fluid to flow from an outer radius 904 to an inner radius 906 of the spring 202. For example, when the second channel 228 of body 102 provides the second fluid to the first space 234 in the body 102 via the example ports 800, 802, 804, the first groove 900 enables the second fluid to flow therethrough to the second space 236 in the body 102. In some examples, a circumference (e.g., an outer circumference) 907 of the spring 202 aligns to one or more of the ports 800, 802, 804 of the second channel 228 when the spring 202 is positioned in the body 102.

As shown in FIG. 9, the first groove 900 is positioned at the inner radius 906 and extends radially outward relative to the axis 902. In some examples, the first groove 900 of FIG. 9 includes an example width 908 that is substantially constant along the length of the first groove 900, as shown in FIG. 9. In other examples, the width 908 is non-uniform (e.g., tapered) along the length of the first groove 900. Further, in some other examples, the first groove 900 is oriented and/or disposed on the spring 202 differently. For example, the first groove 900 may be positioned at the outer radius 904 and, in such examples, extends radially inward relative to the axis 902. Further, while the example of FIG. 9 depicts the first groove 900 as extending only partially between the inner and outer radii 906, 904 in other examples, the first groove extends from the inner radius 906 to the outer radius 904.

The valve spring 202 of the illustrated example includes a first side 910 and a second side 912 opposite the first side 910, each of which defines a surface (e.g., a conical surface) of the spring 202. In the example of FIG. 9, the first side 910 of the spring 202 engages the first valve seat 218 and the second side 912 engages a portion (e.g., the shoulder 226) of the valve body 102. In particular, the first valve seat 218 contacts a portion of the spring 202 at or proximate to the inner radius 906, and the portion of the body 102 contacts a different portion of the spring 202 at or proximate to the outer radius 904.

In some examples, the first side 910 of the spring 202 includes and/or defines an area (e.g., a substantially flat or level surface) 914 for contacting the first valve seat 218, which substantially forms an annular disk in this example. Similarly, in some examples, the second side 912 of the spring 202 includes and/or defines another area (e.g., similar or different relative to the example area 914) for contacting the portion of the valve body 102.

In some examples, the valve spring 202 of the illustrated example includes one or more other grooves (e.g., similar or different relative to the first groove 900) in addition or alternatively to the first groove 900, which further facilitates residue removal associated with the spring 202. For example, as shown in FIG. 9, a second example groove 916 is disposed on the second side 912 of the spring 202. The second groove 916 of FIG. 9 is positioned at the outer radius 904 and extends radially inward relative to the axis 902. In some such examples, the first groove 900 is particularly effective in removing residue formed on and/or proximate to (e.g., within the first space 234 in the body 102) the first side 910 of the spring 202 via the second fluid. Similarly, the second groove 916 is particularly effective in removing residue formed on and/or proximate to (e.g., within the second space 236 in the body 102) the second side 912 of the spring 202 via the second fluid.

Further, in some examples, the first side 910 of the spring 202 is implemented with the one or more other grooves. For example, as shown in FIG. 9, first grooves (e.g., including the first example groove 900) 918 are disposed on the first side 910, at the inner radius 906 in this example, and radially distributed relative to the axis 902. Similarly, in some examples, second grooves (e.g., including the second groove 916) 920 are disposed on the second side 912, at the outer radius 904 in this example, and radially distributed relative to the axis 902. In some such examples, one or more of the example grooves 918, 920 is/are sized, shaped, and/or configured to enable a sufficient amount of the second fluid to flow therethrough at a sufficient velocity to effectively remove residue.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

From the foregoing, it will be appreciated that purge apparatus for use with fluid valves have been disclosed that enable and/or facilitate removal of substance(s) or residue associated with one or more valve components via a fluid. Disclosed examples provide one or more valve components that is/are sized, shaped, formed, and/or configured to receive the fluid and direct the fluid to one or more areas in a fluid valve.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a body for a fluid valve, the body including a channel extending therethrough to receive a fluid for purging the valve, the channel extending at least partially along an inner wall of the body;
   a valve spring interposed between the body and a fluid flow control member to urge a valve seat into sealing engagement with the fluid flow control member; and
   a port fluidly coupled to the channel and disposed in the body, the port to guide the fluid from the channel to the valve spring to remove residue, the valve spring including a first groove disposed on a first surface of the spring and extending radially relative to an axis of the spring, the first groove to receive the fluid, the first groove enable the fluid to flow from an outer diameter of the spring to an inner diameter of the spring.

2. The apparatus of claim 1, further including an annular disk coupled to the inner wall of the body, the channel formed at least partially by the annular disk and the inner wall.

3. The apparatus of claim 2, wherein the port is formed by the annular disk and the inner wall.

4. The apparatus of claim 2, wherein the annular disk is coupled to the inner wall via a seal weld.

5. The apparatus of claim 1, further including one or more other ports fluidly coupled to the channel and disposed proximate to the valve spring, the one or more other ports radially distributed relative to an axis of the inner wall.

6. The apparatus of claim 5, wherein the ports align to a circumference of the valve spring.

7. The apparatus of claim 1, wherein the port has a first cross-sectional area and the channel has a second cross-sectional area, the first cross-sectional area smaller than the second cross-sectional area.

8. The apparatus of claim 1, wherein the first groove has a width that is substantially constant along a length of the first groove.

9. The apparatus of claim 1, wherein the first groove has a non-uniform width, the non-uniform width tapered along a length of the first groove.

10. The apparatus of claim 1, wherein the first surface is a conical surface.

11. An apparatus, comprising:
a spring for a fluid valve, the spring interposed between a valve body and a fluid flow control member to urge a valve seat into sealing engagement with the fluid flow control member; and
a first groove disposed on a first surface of the spring and extending radially relative to an axis of the spring, the first groove to receive a fluid from a channel extending through the valve body, wherein the first groove enables the fluid to flow from an outer diameter of the spring to an inner diameter of the spring to remove residue.

12. The apparatus of claim 11, further including a second groove disposed on a second surface opposite the first surface of the spring and extending radially relative to an axis of the spring, wherein the second groove enables the fluid to flow from the outer diameter of the spring to the inner diameter of the spring to remove residue.

13. The apparatus of claim 12, wherein the first or second groove is positioned at the inner diameter of the spring and extends radially outward relative to the axis of the spring.

14. The apparatus of claim 12, wherein the first or second groove is positioned at the outer diameter of the spring and extends radially inward relative to the axis of the spring.

15. The apparatus of claim 11, further including one or more other grooves disposed on the spring and extending radially relative to the axis of the spring, the one or more grooves radially distributed relative to an axis of the spring.

16. The apparatus of claim 11, wherein the first groove has a width that is substantially constant along a length of the first groove.

17. The apparatus of claim 11, wherein the first groove has a non-uniform width, the non-uniform width tapered along a length of the first groove.

18. The apparatus of claim 11, wherein the first surface is a conical surface.

19. An apparatus, comprising:
means for urging a valve seat into a sealing engagement with a fluid flow control member, the urging means between a valve body and the fluid flow control member; and
first means for receiving a fluid from a channel extending through the valve body, the first receiving means disposed on a first surface of the urging means and extending radially relative to an axis of the urging means, the first receiving means to enable the fluid to flow from an outer diameter of the urging means to an inner diameter of the urging means to remove residue.

20. The apparatus of claim 19, further including second means for receiving disposed on a second surface opposite the first surface of the urging means and extending radially relative to an axis of the urging means, wherein the second receiving means enables the fluid to flow from the outer diameter of the urging means to the inner diameter of the urging means to remove residue.

21. The apparatus of claim 20, wherein at least one of the first receiving means and the second receiving means is positioned at the inner diameter of the urging means and extends radially outward relative to the axis of the urging means.

22. The apparatus of claim 20, wherein at least one of the first receiving means and the second receiving means is positioned at the outer diameter of the urging means and extends radially inward relative to the axis of the urging means.

23. The apparatus of claim 19, further including one or more other means for receiving disposed on the urging means and extending radially relative to the axis of the urging means, the one or more other receiving means radially distributed relative to an axis of the urging means.

24. The apparatus of claim 19, wherein the first receiving means has a width that is substantially constant along a length of the first receiving means.

25. The apparatus of claim 19, wherein the first receiving means has a non-uniform width, the non-uniform width tapered along a length of the first receiving means.

* * * * *